US011422901B2

(12) United States Patent
Ali et al.

(10) Patent No.: US 11,422,901 B2
(45) Date of Patent: Aug. 23, 2022

(54) OPERATING SYSTEM REPAIRS VIA RECOVERY AGENTS

(71) Applicant: HEWLETT-PACKARD DEVELOPMENT COMPANY, L.P., Spring, TX (US)

(72) Inventors: Vali Ali, Houston, TX (US); Michael Provencher, Houston, TX (US); Charles Ricardo Staub, Porto Alegre (BR); Juliano Francisco Cagnini Ciocari, Porto Alegre (BR); Paulo Alcantara, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 16 days.

(21) Appl. No.: 16/478,800

(22) PCT Filed: Nov. 6, 2017

(86) PCT No.: PCT/US2017/060105
§ 371 (c)(1),
(2) Date: Jul. 17, 2019

(87) PCT Pub. No.: WO2019/089047
PCT Pub. Date: May 9, 2019

(65) Prior Publication Data
US 2021/0286685 A1 Sep. 16, 2021

(51) Int. Cl.
G06F 11/00 (2006.01)
G06F 11/14 (2006.01)
(Continued)

(52) U.S. Cl.
CPC ........ *G06F 11/1469* (2013.01); *G06F 9/4401* (2013.01); *G06F 11/2284* (2013.01); *G06F 2201/82* (2013.01)

(58) Field of Classification Search
CPC ............. G06F 11/1469; G06F 11/2284; G06F 9/4401; G06F 11/0793; G06F 2201/82
(Continued)

(56) References Cited

U.S. PATENT DOCUMENTS 5,732,268 A 3/1998 Bizzarri
7,673,301 B1 3/2010 Righi et al.
(Continued)

FOREIGN PATENT DOCUMENTS

TW I271651 B 1/2007

OTHER PUBLICATIONS

Deployment Image Servicing and Management, May 2, 2017.
(Continued)

*Primary Examiner* — Sarai E Butler
(74) *Attorney, Agent, or Firm* — HP Inc. Patent Department

(57) ABSTRACT

An example computing device includes a first storage device storing a firmware. The computing device also includes a second storage device storing an operating system of the computing device. The computing device further includes a processor. The processor is to retrieve a recovery agent from another computing device via the firmware; validate the recovery agent; execute the recovery agent to retrieve recovery data; validate the recovery data; and repair the operating system using the recovery data via the recovery agent.

13 Claims, 6 Drawing Sheets

(51) Int. Cl.
  *G06F 9/4401* (2018.01)
  *G06F 11/22* (2006.01)
(58) Field of Classification Search
  USPC ..................................................... 714/1–57
  See application file for complete search history.

(56) References Cited

U.S. PATENT DOCUMENTS

| | | | |
|---|---|---|---|
| 8,261,126 B2 | 9/2012 | Sosnosky et al. | |
| 8,707,086 B2 | 4/2014 | Poisner | |
| 8,990,902 B2 | 3/2015 | McCarron et al. | |
| 2004/0172578 A1 | 9/2004 | Chen et al. | |
| 2005/0081004 A1* | 4/2005 | Zhang | G06F 11/1469 |
| | | | 714/E11.122 |
| 2005/0204199 A1 | 9/2005 | Harper et al. | |
| 2006/0015711 A1* | 1/2006 | Bang | G06F 11/1417 |
| | | | 713/2 |
| 2006/0145133 A1* | 7/2006 | Komarla | H04L 67/34 |
| | | | 257/1 |
| 2008/0155331 A1 | 6/2008 | Rothman et al. | |
| 2010/0098243 A1* | 4/2010 | Chopart | G06F 21/31 |
| | | | 726/30 |
| 2012/0144383 A1* | 6/2012 | Mishra | G06F 11/36 |
| | | | 714/48 |
| 2012/0159254 A1* | 6/2012 | Su | G06F 11/2284 |
| | | | 714/36 |
| 2012/0272090 A1 | 10/2012 | Poisner | |
| 2013/0326260 A1* | 12/2013 | Wei | G06F 11/1469 |
| | | | 714/3 |
| 2014/0065958 A1* | 3/2014 | Yao | H04B 5/0031 |
| | | | 455/41.1 |
| 2014/0136893 A1* | 5/2014 | Xie | G06F 11/0793 |
| | | | 714/15 |
| 2014/0181579 A1* | 6/2014 | Whitehead | G06F 11/1461 |
| | | | 707/654 |
| 2014/0330784 A1* | 11/2014 | Sundaram | G06F 3/065 |
| | | | 707/639 |
| 2015/0143172 A1* | 5/2015 | Huang | G06F 11/2284 |
| | | | 714/15 |
| 2016/0014175 A1* | 1/2016 | Somuah | H04L 65/60 |
| | | | 709/202 |
| 2016/0026518 A1* | 1/2016 | Foster | G06F 11/2294 |
| | | | 714/15 |
| 2016/0117227 A1* | 4/2016 | Hetrick | G06F 11/1469 |
| | | | 714/19 |
| 2017/0085383 A1* | 3/2017 | Rao | G06F 8/654 |

OTHER PUBLICATIONS

HP Sure Start Gen3—Technical whitepaper, Jan. 2017.
Image Based Backup to the Cloud Storage Specifics, https://www.cloudberrylab.com/image-based-backup-to-the-cloud-storage-specifics.aspx, Sep. 18, 2017.
NIST Special Publication 800-147, BIOS Protection Guidelines, Apr. 2011.
Operating System Deployment Security Best Practices and Privacy Information, 2007.
Windows Recovery Environment (Windows RE), May 2, 2017.

* cited by examiner

OPERATING SYSTEM REPAIRS VIA RECOVERY AGENTS

BACKGROUND

An operating system of a computing device may control many aspects of computing device. When the operating system is corrupted or damaged, the operations of the computing device may be severely limited or the computing device may be rendered inoperable.

BRIEF DESCRIPTION OF THE DRAWINGS

Some examples of the present application are described with respect to the following figures.

DETAILED DESCRIPTION

When an operating system of a computing device is corrupted or damaged, the operating system may be repaired via a recovery operation. Some recovery operations depend on external bootable media (e.g., a Universal Serial Bus (USB) drive, a DVD, etc.). Some recovery operations may involve extensive manual configurations. Thus, the recovery operation may be time consuming and inconvenient for the user of the computing device.

Examples described herein provide an approach to repair an operating system via a recovery agent in a secure and automated manner. For example, a computing device may include a first storage device storing a firmware and a second storage device storing an operating system of the computing device. The computing device may also include a processor to: retrieve a recovery agent from another computing device via the firmware; validate the recovery agent; execute the recovery agent to retrieve recovery data; validate the recovery data; and repair the operating system using the recovery data.

In another example, a non-transitory computer-readable storage medium may include instructions that when executed cause a processor of a computing device to: in response to detecting a recovery trigger, perform a recovery operation at the first computing device upon a completion of a Power On Self-Test (POST) of the first computing device. The recovery operation may include: retrieve a recovery agent from a second computing device via a firmware of the computing device; validate the recovery agent; execute the recovery agent to retrieve recovery data from a third computing device: validate the recovery data; and repair the operating system using the recovery data via the recovery agent.

In another example, a non-transitory computer-readable storage medium may include instructions that when executed cause a processor of a computing device to: in response to detecting a recovery trigger during an execution of an operating system of the computing device or detecting a failed execution of the operating system, perform a recovery operation at the computing device. The recovery operation may include: retrieve a recovery agent from a first remote repository via a firmware of the computing device; validate the recovery agent; execute the recovery agent to retrieve recovery data from a second remote repository; validate the recovery data; and repair the operating system using the recovery data via the recovery agent. Thus, examples described herein may reduce difficulty and/or time associated with repairing an operating system. Examples described herein may also reduce the security risks (e.g., repairing the operating system using compromised recovery data) associated with repairing an operating system.

Figure 1:
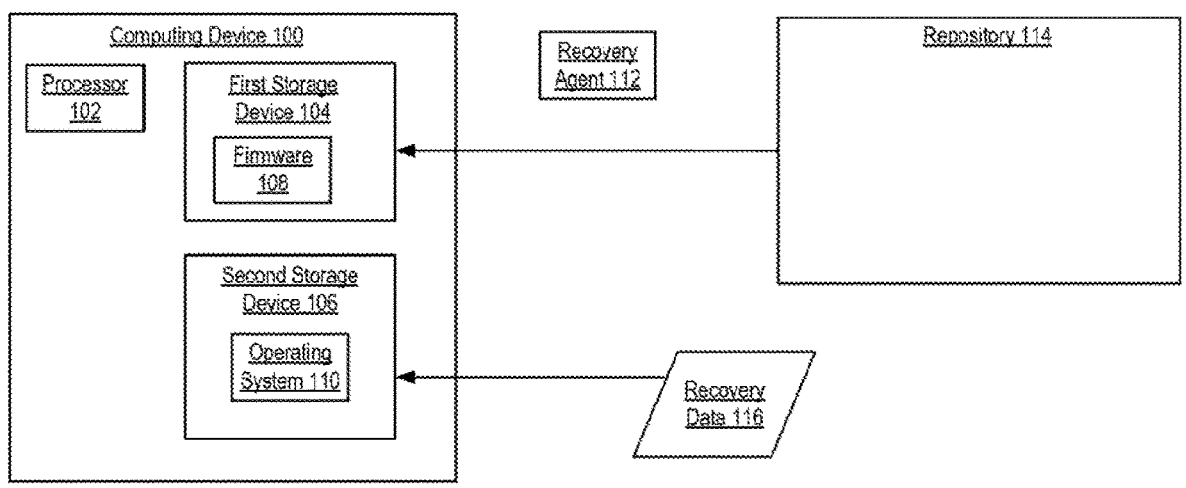
FIG. 1 illustrates a computing device to repair an operating system of the computing device via a recovery agent, according to an example.

FIG. 1 illustrates a computing device 100 to repair an operating system 10 of computing device 100 via a recovery agent, according to an example. Computing device 100 may be, for example, a web-based server, a local area network server, a cloud-based server, a notebook computer, a desktop computer, an all-in-one system, a tablet computing device, a mobile phone, an electronic book reader, or any other electronic device suitable to execute an agent application to repair an operating system.

Computing device 100 may include a processor 102, a first storage device 104, and a second storage device 106. Processor 102 may be in communication with first storage device 104 and/or second storage device 106. Processor 102 may control operations of computing device 100. Storage devices 104 and 106 may store data. In some examples, storage devices 104 and/or 106 may be implemented using non-volatile memory, such as hard disk drives, solid state storage, flash memory, Electrically Erasable Programmable Read-Only Memory (EEPROM), etc. In some examples, first storage device 104 may store firmware 108. Second storage device 106 may store an operating system 110.

Firmware 108 may perform hardware initialization and/or configuration of components (such as storage device 106, processor 102, etc.) of computing device 100. Firmware 108 may also perform runtime services for operation system(s) and application(s) executing at computing device 100. In some examples, firmware 108 may be implemented as a Unified Extensible Firmware Interface (UEFI). Operating system 110 may control and manage resources (hardware and software) of computing device 100. Operating system 110 may take control of computing device 100 when the boot up process of computing device 100 is completed and firmware 108 passes control to operating system 110.

During operation, firmware 108 may determine if operating system 110 is to be repaired. In some examples, firmware 108 may initiate a recovery operation in response to detecting a recovery trigger. A recovery trigger may be an event that informs firmware 108 a recovery operation is to be initiated. A recovery trigger may include:

an operating system failure, such as operating system corruption due to malware attack:

a failure to execute the operating system, such as when an operating system fails to load after a Power-On Self-Test (POST);

an external recovery instruction, such as a user initiated keypress during boot-time, a command from a system administrator, etc.;

a recovery instruction from a monitoring application, such as a software application that monitors the health of computing device 100; or a combination thereof.

Firmware 108 may initiate a recovery operation from a secure, stable state. Thus, even though firmware 108 may have detected the recovery trigger(s) at various points in the pre-boot through runtime environment, firmware 108 may not immediately initiate the recovery operation. Instead, firmware 108 may initiate the recovery operation upon completion of a POST subsequent to the detection of a recovery trigger. For example, during the runtime environment (i.e., operating system 110 may be executing), firmware 108 detects a recovery trigger. Computing device 100 then may be rebooted. During the reboot, immediately after the completion of the POST, firmware 108 may initiate the recovery operation.

During the recovery operation, firmware 108 may retrieve (e.g., download) a recovery agent 112 from a repository 114. In some examples, repository 114 may be a second computing device (computing device 100 may be the first computing device) or a set of computing devices. In some examples, repository 114 may be implemented as a cloud storage (e.g., a public cloud or a private cloud). Recovery agent 112 may be a software application that repairs operating system 110. Recovery agent 112 may be implemented using instructions executable by processor 102. Firmware 108 may validate recovery agent 112 to ensure recovery agent 112 is not compromised. Once validated, firmware 108 may execute recovery agent 112 at computing device 100. Recovery agent 112 may retrieve recovery data 116. In some examples, recovery data 116 may be an operating system image (e.g. a file containing the complete contents and structure of an operating system, such as operating system 110). Recovery agent 112 may validate recovery data 116. When validated, recovery agent 112 may use recovery data 116. The recovery operation is described in more detail in FIG. 2.

Figure 2:
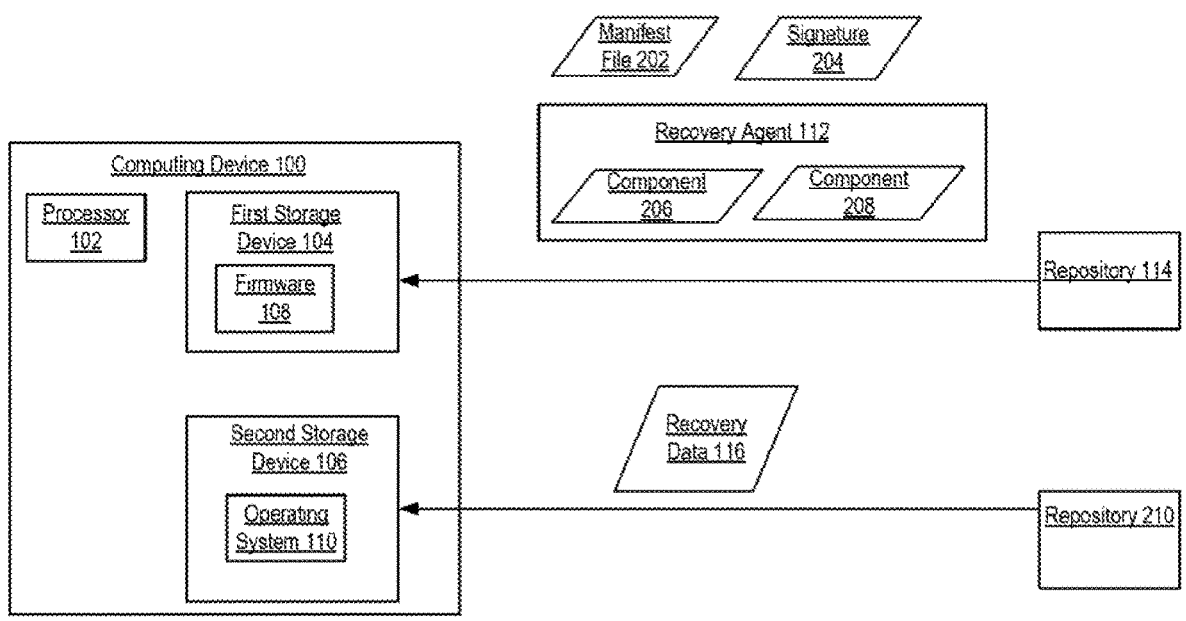
FIG. 2 illustrates a computing device to repair an operating system of the computing device via a recovery agent, according to another example.

Turning to FIG. 2, when firmware 108 is to retrieve recovery agent 112, firmware 108 may use an embedded network stack to retrieve recovery agent 112 from repository 114. Firmware 108 may first retrieve a manifest file 202 and a signature 204 of manifest file 202. Manifest file 202 may indicate components (e.g., files) that make up recovery agent 112 and a unique hash value for each of the component. Signature 204 may be any digital cryptography signature that can be used to prove or verify the integrity or authenticity of manifest file 202. Signature 204 may be generated using a signing algorithm, such as Secure Hash Algorithm (SHA-1), and manifest file 202.

When computing device 100 receives manifest file 202 and signature 204, firmware 108 may use a signature verifying algorithm to determine if signature 204 is to be accepted. If signature 204 is accepted, then manifest file 202 is validated. In response to validating manifest file 202, firmware 108 may retrieve/download the remaining components of recovery agent 112, such as components 206 and 208. Retrieving recovery agent 112 is described in more detail in FIG. 3.

When firmware 108 has retrieved recovery agent 112, firmware 108 may execute recovery agent 112. For example, firmware 108 may use a UEFI boot manager to execute recovery agent 112. Recovery agent 112 may retrieve/download recovery data 116 from a repository 210 that is similar to repository 114. Recovery agent 112 may store recovery data 116 in second storage device 106. Recovery agent 112 may validate recovery data 116. For example, recovery agent 112 may validate recovery data 116 via a digital signature. In some examples, a controller (not shown) of computing device 100 may be used to validate manifest file 202 and recovery data 116. In response to validating recovery data 116, recovery agent 112 may repair operating system 110 using recovery data 116. Repairing operating system 110 may include replacing the current copy of operating system 110 with a new copy of operating system 110 (e.g., re-imaging operating system 110 using recovery data 116), replacing portions of operating system 110 with new copies of the corresponding files, or a combination thereof.

Figure 3:
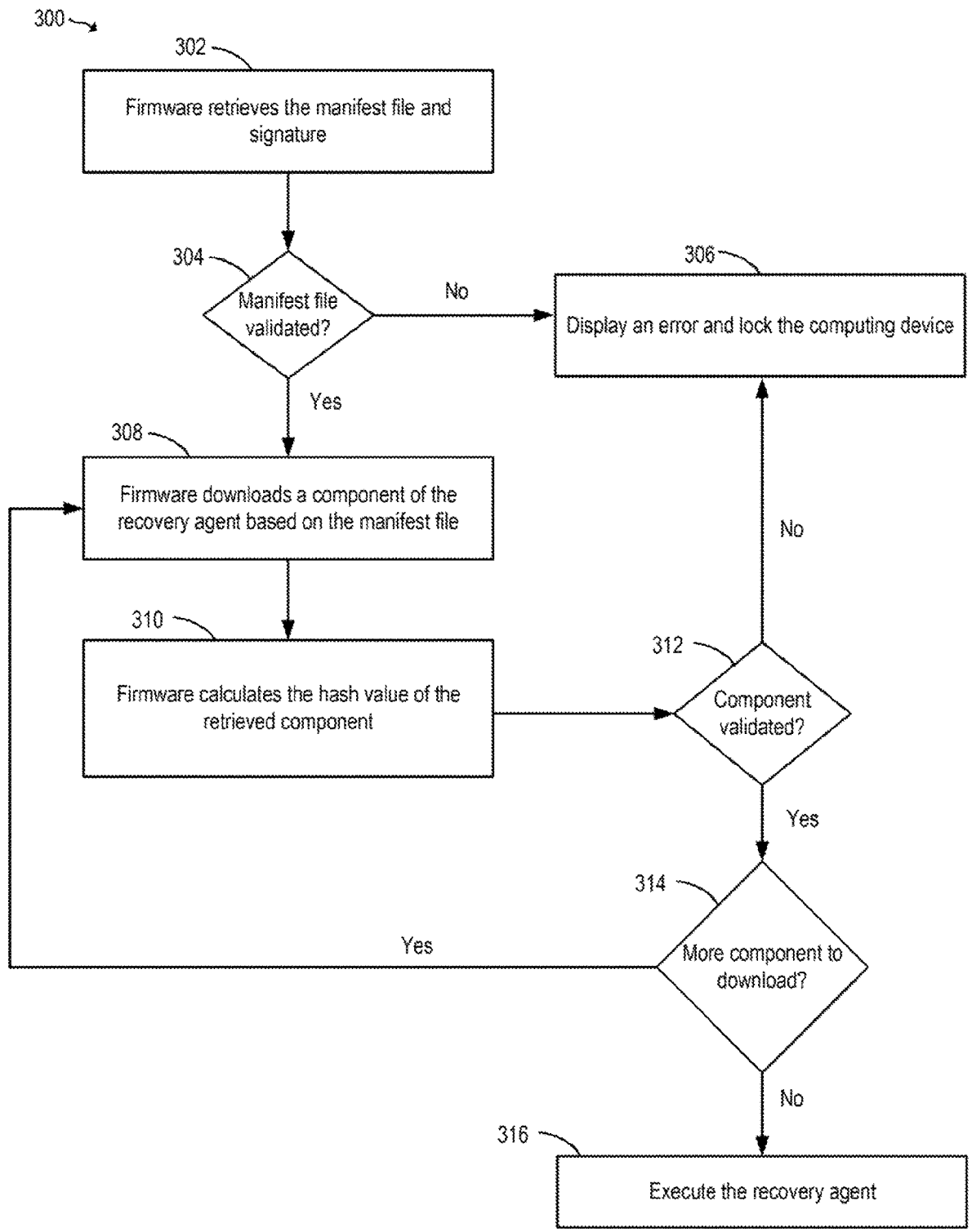
FIG. 3 illustrates a method of operation at a computing device to retrieve a recovery agent, according to an example.

FIG. 3 illustrates a method 300 of operation at computing device 100 to retrieve recovery agent 112, according to an example. At 302, firmware 108 may retrieve manifest file 202 and signature 204. At 304, firmware 108 may determine if manifest file 202 has been validated. In response to determining that manifest file 202 has not been validated, firmware 108 may generate an error message to be displayed (e.g., at a display connected to computing device 100) and lock computing device 100, at 306. In response to determining that manifest file 202 has been validated, firmware 108 may retrieve a component of recovery agent 112 based on manifest file 202, such as component 206, at 308. At 310, firmware 108 may calculate the hash value of the retrieved component.

At 312, firmware 108 may validate the component by comparing the calculated hash value to the corresponding hash value in manifest file 202. In response to a determination that the calculated hash value matches the corresponding hash value, firmware 108 may determine that the component has been validated. Firmware 108 may read manifest file 202 to determine if there is any more component of recovery agent 112 left to be retrieved, at 314. In response to a determination that there is more component left to be retrieved, method 300 may return to 308. In response to a determination that there is no more component left to be retrieved, firmware 108 may execute recovery agent 112, at 316. When firmware 108 determines that the calculated hash value does not match the corresponding hash value at 312, method 300 may return to 306.

Figure 4:
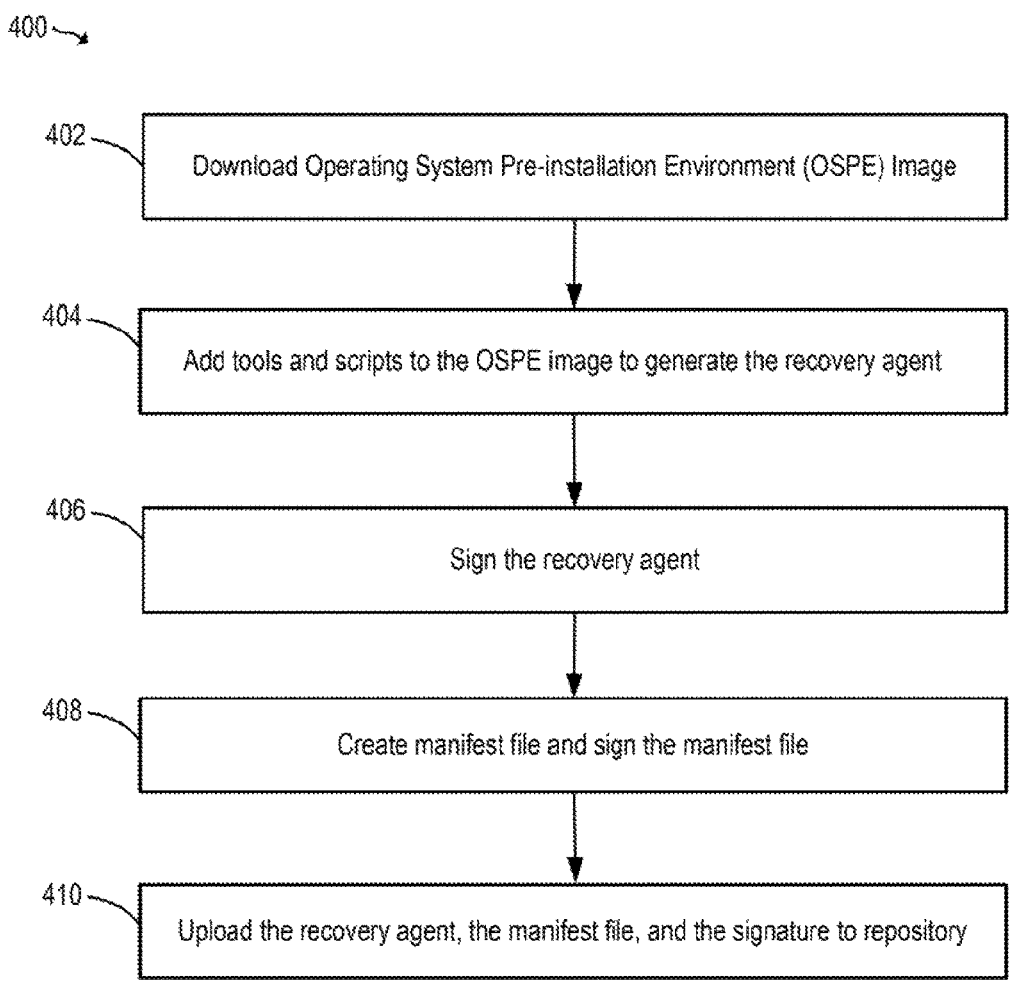
FIG. 4 illustrates a method of operation at a computing device to prepare a recovery agent for subsequent retrieval, according to an example.

FIG. 4 illustrates a method 400 of operation at a computing device to prepare a recovery agent for subsequent retrieval, according to an example. Method 400 may be described with reference to computing device 100, although it should be understood that method 400 may be implemented by any other computing device. At 402, computing device 100 may download an Operating System Pre-installation Environment (OSPE) image. An OSPE may be a software application used for deploying/installing an operating system. At 404, particular tools (e.g., software applications) and scripts may be added to the OSPE image to generate a customized copy of the OSPE. Recovery agent 112 may be implemented as the customized copy. At 406, recovery agent 112 may be digitally signed to generate signatures of the components of recovery agent 112. For example, the signatures may be hash values of components of recovery agents 112. The signatures of the components may be stored in manifest file 202.

At 408, manifest fife 202 may be created to catalog components of recovery agent 112 and store the unique hash values for each component of recovery agent 112. Also, manifest file 202 may be digitally signed to create signature 204. At 410, recovery agent 112, manifest file 202, and signature 204 may be uploaded to a repository, such as repository 114 for subsequent retrieval.

Figure 5:
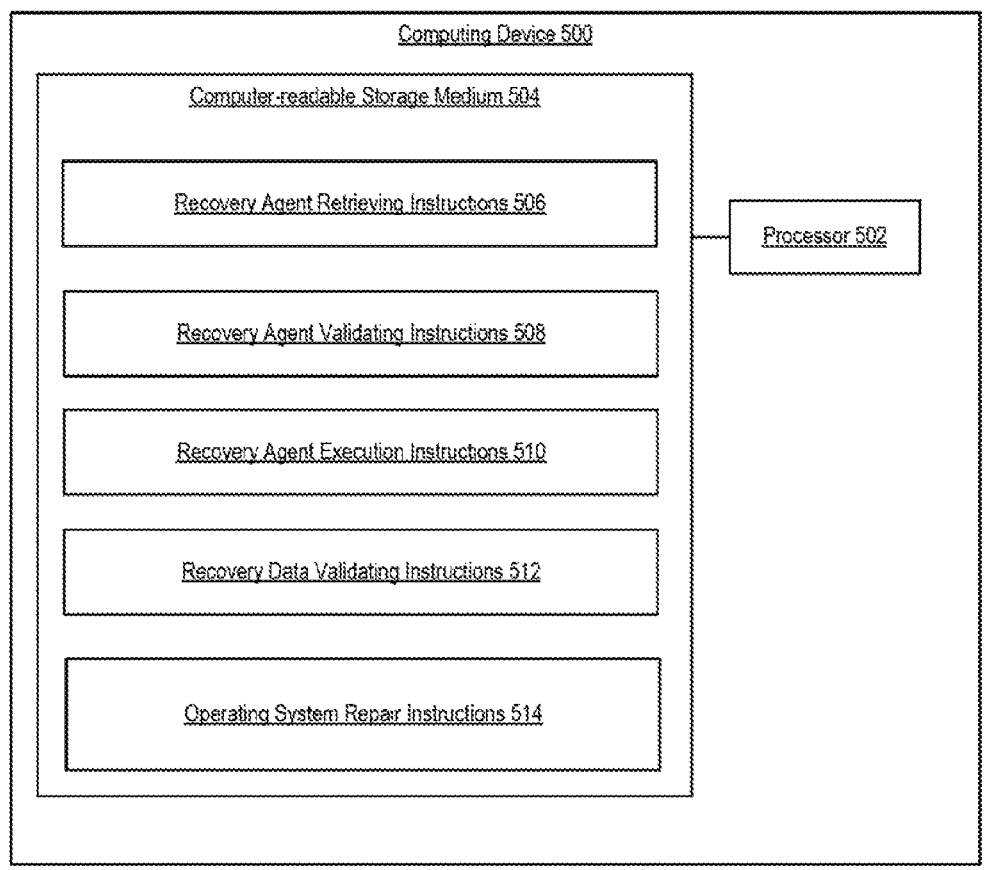
FIG. 5 illustrates a computing device including to repair an operating system of the computing device via a recovery agent, according to another example.

FIG. 5 illustrates a computing device 500 including to repair an operating system of the computing device via a recovery agent, according to another example. Computing device 500 may implement computing device 100 of FIGS. 1-2. Computing Device 500 may include a processor 502 and a computer-readable storage medium 504.

Processor 502 may be a central processing unit (CPU), a semiconductor-based microprocessor, and/or other hardware devices suitable for retrieval and execution of instructions stored in computer-readable storage medium 504. Computer-readable storage medium 504 may be any electronic, magnetic, optical, or other physical storage device that contains or stores executable instructions. Thus, computer-readable storage medium 504 may be, for example, Random Access Memory (RAM), an Electrically Erasable Programmable Read-Only Memory (EEPROM), a storage device, an optical disc, etc. In some examples, computer-readable storage medium 504 may be a non-transitory storage medium, where the term "non-transitory" does not encompass transitory propagating signals. Computer-readable storage medium 504 may be encoded with instructions 506-514.

Recovery agent retrieving instructions 506 may retrieve a recovery agent in response to detecting a recovery trigger. For example, referring to FIG. 1, firmware 108 may retrieve recovery agent 112 in response to detecting a recovery trigger. Recovery agent validating instructions 508 may validate the recovery agent. For example, referring to FIG. 2, firmware 108 may validate recovery agent 112. Recovery agent execution instructions 510 may execute the recovery agent when the recovery agent is validated. For example, referring to FIG. 2, firmware 108 may execute recovery agent 112. Recovery data validating instructions 512 may validate recovery data used to repair an operating system (not shown) of computing device 500. For example, referring to FIG. 2, recovery agent 112 may validate recovery data 116. Operating system repair instructions 514 may repair the operating system via the recovery agent. For example, referring to FIG. 2, recovery agent 112 may use recovery data 116 to repair operating system 110.

Figure 6:
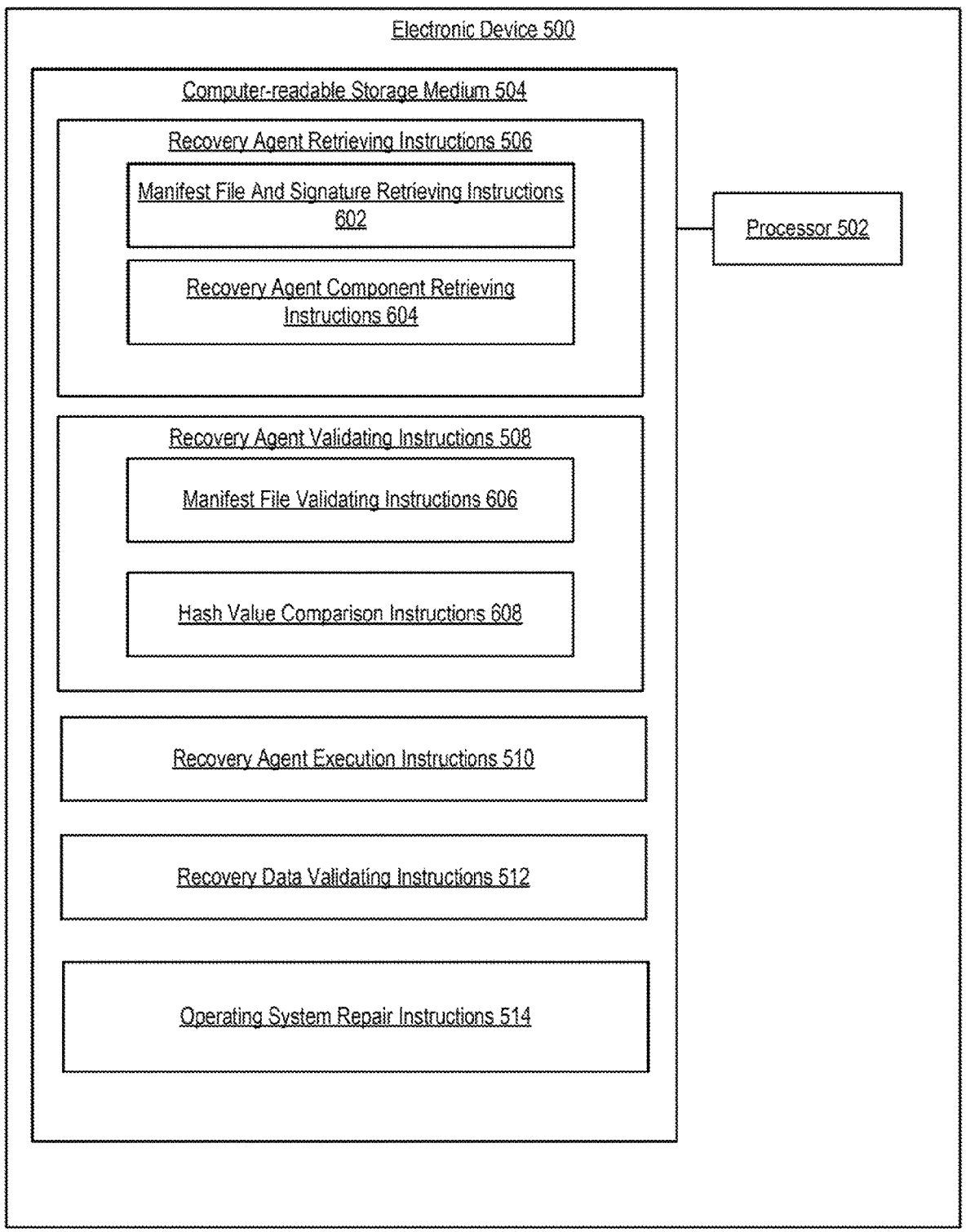
FIG. 6 illustrates a computing device to repair an operating system of the computing device via a recovery agent, according to another example.

FIG. 6 illustrates computing device 500 to repair an operating system of the computing device via a recovery agent, according to another example. In some examples, recovery agent retrieving instructions 506 may include manifest file and signature retrieving instructions 602 and recovery agent component retrieving instructions 604. Manifest file and signature retrieving instructions 602 may retrieve a manifest file and a signature of the manifest file so that the manifest file can be validated. For example, referring to FIG. 2, firmware 108 may retrieve manifest file 202 and signature 204 from repository 114. Recovery agent component retrieving instructions 604 may retrieve components that make up a recovery agent. For example, referring to FIG. 2, firmware 108 may retrieve components 206 and 208 of recovery agent 112.

In some examples, recovery agent validating instructions 508 may include manifest file validating instructions 606 and hash value comparison instructions 608. Manifest file validating instructions 606 may validate a manifest file. For example, referring to FIG. 2, firmware 108 may validate manifest file 202 based on signature 204. Hash value comparison instructions 608 may validate each retrieved component of a recovery agent. For example, referring to FIG. 3, at 312, firmware 108 may validate the component by comparing the calculated hash value to the corresponding hash value in manifest file 202.

The use of "comprising", "including" or "having" are synonymous and variations thereof herein are meant to be inclusive or open-ended and do not exclude additional unrecited elements or method steps.

What is claimed:

1. A first computing device comprising:
a first storage device storing a firmware;
a second storage device storing an operating system of the first computing device; and
a processor to:
retrieve, with the firmware in the first computing device, a recovery agent over a network from a second computing device, wherein the processor is to retrieve the recovery agent by:
downloading a manifest file and a signature of the manifest file, wherein the manifest file indicates components that make up the recovery agent, and the manifest file includes hash values of the components that make up the recovery agent,
validating the manifest file based on the signature, and
retrieving, based on the manifest file, the components that make up the recovery agent;
validate the recovery agent by validating each respective component of the components by comparing a calculated hash value of the respective component with the hash value of the respective component in the manifest file;
in response to the validating of the components, execute the recovery agent to retrieve recovery data;
validate the recovery data; and
repair, using the recovery agent, the operating system based on the recovery data.

2. The first computing device of claim 1, wherein the processor is to retrieve the recovery agent subsequent to a reboot of the first computing device.

3. The first computing device of claim 1, wherein the recovery data includes an operating system image.

4. The first computing device of claim 1, wherein the firmware is a Unified Extensible Firmware Interface (UEFI).

5. The first computing device of claim 1, wherein the processor is to retrieve the recovery agent, validate the recovery agent, execute the recovery agent, validate the recovery data, and repair the operating system as part of a recovery operation at the first computing device after a completion of a Power On Self-Test (POST) of the first computing device.

6. A non-transitory computer-readable storage medium comprising instructions that when executed cause a first computing device to:
in response to detecting a recovery trigger, perform a recovery operation at the first computing device after a completion of a Power On Self-Test (POST) of the first computing device, wherein the recovery operation includes:
retrieving, with a firmware of the first computing device, a recovery agent over a network from a second computing device, wherein the retrieving of the recovery agent comprises:
downloading a manifest file and a signature of the manifest file, wherein the manifest file indicates components that make up the recovery agent, and the manifest file includes hash values of the components that make up the recovery agent,
validating the manifest file based on the signature, and
retrieving, based on the manifest file, the components that make up the recovery agent;

validating the recovery agent by validating each respective component of the components by comparing a calculated hash value of the respective component with the hash value of the respective component in the manifest file;
in response to the validating of the components, executing the recovery agent to retrieve recovery data from a third computing device;
validating the recovery data; and
repairing, with the recovery agent, an operating system of the first computing device using the recovery data.

7. The non-transitory computer-readable storage medium of claim 6, wherein the instructions when executed further cause the first computing device to detect the recovery trigger during an execution of the operating system, wherein the execution of the operating system is prior to the POST.

8. The non-transitory computer-readable storage medium of claim 6, wherein the recovery data includes an operating system image.

9. The non-transitory computer-readable storage medium of claim 8, wherein the instructions when executed further cause the first computing device to repair the operating system by re-imaging the first computing device using the operating system image via the recovery agent.

10. The non-transitory computer-readable storage medium of claim 6, wherein the firmware is a Unified Extensible Firmware Interface (UEFI).

11. A non-transitory computer-readable storage medium comprising instructions that when executed cause a first computing device to:
in response to detecting a recovery trigger during an execution of an operating system of the first computing device, perform a recovery operation at the first computing device, wherein the recovery operation includes:
retrieving, with a firmware of the first computing device, a recovery agent over a network from a first remote repository, wherein the retrieving of the recovery agent comprises:
downloading a manifest file and a signature of the manifest file, wherein the manifest file indicates components that make up the recovery agent, and the manifest file includes hash values of the components that make up the recovery agent,
validating the manifest file based on the signature, and
retrieving, based on the manifest file, the components that make up the recovery agent;
validating the recovery agent by validating each respective component of the components by comparing a calculated hash value of the respective component with the hash value of the respective component in the manifest file;
in response to the validating of the components, executing the recovery agent to retrieve recovery data from a second remote repository;
validating the recovery data; and
repairing, with the recovery agent, the operating system using the recovery data.

12. The non-transitory computer-readable storage medium of claim 11, wherein the recovery trigger includes an operating system failure, a failure to execute the operating system, an external recovery instruction, a recovery instruction from a monitoring application, or a combination thereof.

13. The non-transitory computer-readable storage medium of claim 11, wherein the instructions that when executed cause the first computing device to perform the recovery operation at the first computing device after a completion of a Power On Self-Test (POST) of the first computing device.

* * * * *